US008965348B1

(12) United States Patent
Cronin

(10) Patent No.: US 8,965,348 B1
(45) Date of Patent: Feb. 24, 2015

(54) SHARING MOBILE APPLICATIONS BETWEEN CALLERS

(71) Applicant: OTO Technologies LLC, Charleston, SC (US)

(72) Inventor: John Cronin, Bonita Springs, FL (US)

(73) Assignee: GrandiOs Technologies, LLC, Wilmington, DE (US)

( * ) Notice: Subject to any disclaimer, the term of this patent is extended or adjusted under 35 U.S.C. 154(b) by 0 days.

(21) Appl. No.: 14/309,117

(22) Filed: Jun. 19, 2014

Related U.S. Application Data

(60) Provisional application No. 62/007,927, filed on Jun. 4, 2014, provisional application No. 62/007,858, filed on Jun. 4, 2014.

(51) Int. Cl.
| | | |
|---|---|---|
| *H04M 3/42* | (2006.01) | |
| *H04W 4/00* | (2009.01) | |
| *H04W 8/24* | (2009.01) | |
| *H04W 4/20* | (2009.01) | |

(52) U.S. Cl.
CPC ............... *H04W 4/001* (2013.01); *H04W 8/24* (2013.01); *H04W 4/20* (2013.01)
USPC .......................... 455/414.1; 455/41.1; 455/39

(58) Field of Classification Search
CPC . H04L 61/1535; H04L 63/065; H04L 67/104; H04L 67/1068; H04L 67/1093; H04L 69/329; H04W 76/023; H04W 4/008; H04W 8/005; H04W 12/06; H04W 48/16; H04W 4/005; H04W 52/0209; H04W 72/048; H04W 76/02; H04W 76/041
USPC .............................. 455/41.1–41.3, 39, 414.1
See application file for complete search history.

(56) References Cited

U.S. PATENT DOCUMENTS

| | | |
|---|---|---|
| 6,285,757 B1 | 9/2001 | Carroll et al. |
| 6,477,117 B1 | 11/2002 | Narayanaswami et al. |
| 6,556,222 B1 | 4/2003 | Narayanaswami |
| 6,678,535 B1 | 1/2004 | Narayanaswami |
| 6,720,860 B1 | 4/2004 | Narayanaswami |
| 7,477,890 B1 | 1/2009 | Narayanaswami |

(Continued)

FOREIGN PATENT DOCUMENTS

| | | |
|---|---|---|
| WO | WO 2005103867 A1 * | 11/2005 |
| WO | WO 2012/110527 | 8/2012 |
| WO | WO 2013/180850 | 12/2013 |

OTHER PUBLICATIONS

Apk Manager Plus—Android Apps on Google Play; Aug. 5, 2011 http://play.google.com/store/apps/details?id=com.magmamobile.apkmanager.plus.

(Continued)

*Primary Examiner* — Chuong A Ngo
(74) *Attorney, Agent, or Firm* — Lewis Roca Rothgerber LLP

(57) ABSTRACT

Systems and methods for sharing of mobile applications between callers are provided. A telephone call connection may be provided between a first mobile device and a second mobile device. A selection may be received from a user of the first mobile device that indicates at least one application previously enabled for sharing. It may be detect that the second mobile device has also enabled sharing of the same application. The application may be executed on the first mobile device and the second mobile device. Further, any updated data related to the application may be automatically exchanged between the first mobile device and the second mobile device.

19 Claims, 7 Drawing Sheets

(56) References Cited

U.S. PATENT DOCUMENTS

| | | | |
|---|---|---|---|
| 7,506,269 | B2 | 3/2009 | Lang |
| 7,835,689 | B2 | 11/2010 | Goldberg et al. |
| 8,244,283 | B1 | 8/2012 | Booth |
| 8,355,711 | B2 | 1/2013 | Heins et al. |
| 8,478,937 | B2 | 7/2013 | Grube et al. |
| 8,510,808 | B2 | 8/2013 | McNeil et al. |
| 8,562,489 | B2 | 10/2013 | Burton et al. |
| 8,620,353 | B1 | 12/2013 | Kahn et al. |
| 8,627,019 | B2 | 1/2014 | Yang |
| 8,725,842 | B1 | 5/2014 | Al-Nasser |
| 8,744,804 | B2 | 6/2014 | Messenger et al. |
| 8,758,201 | B2 | 6/2014 | Ashby et al. |
| 8,787,006 | B2 | 7/2014 | Golko et al. |
| 2012/0077536 | A1 | 3/2012 | Goel et al. |
| 2012/0216035 | A1 | 8/2012 | Leggette et al. |
| 2012/0324198 | A1 | 12/2012 | Spradlin et al. |
| 2013/0040617 | A1* | 2/2013 | Lee et al. .................. 455/414.1 |
| 2013/0151622 | A1 | 6/2013 | Goel et al. |
| 2013/0205219 | A1 | 8/2013 | Moha et al. |
| 2013/0216065 | A1 | 8/2013 | Nguyen |
| 2013/0273879 | A1 | 10/2013 | Eisen et al. |
| 2013/0326168 | A1 | 12/2013 | Chang et al. |
| 2013/0332841 | A1 | 12/2013 | Gallet et al. |
| 2013/0332854 | A1 | 12/2013 | Roman et al. |
| 2013/0335340 | A1 | 12/2013 | Smith |
| 2014/0006540 | A1 | 1/2014 | Rao et al. |
| 2014/0185499 | A1* | 7/2014 | Ray et al. ....................... 370/310 |

OTHER PUBLICATIONS

ApkShare—Android Apps on Google Play; ApkShare NewPower Studios—Jan. 10, 2014.

AppShare(+)—Android Apps on Google Play, Oct. 11, 2013.

Cha, Bonnie; "Qualcomm's Toq Smartwatch Needs More Time—Product Reviews", Dec. 26, 2013. http://allthingsd.com/20131226/qualcomms-toq-smartwatch-needs-more-time/.

Chen, Brian X.; "Tech Attire, More Beta Than Chic", The New York Times, Jan. 8, 2014. http://www.nytim es.com/2014/01/09/technology/tech-attire-more-beta-than-chic.html?hpw&rref=technology.

Chi, Jones; "My App Sharer", Google play, Feb. 8, 2014.

Integrating Pebble Watchapps with Phone Apps. © 2013 Pebble. Date of download: Jan. 10, 2014.

Jackson, William; "App would give 911 operators control of callers' smart phones—GCN", Jun. 12, 2013.

Migicovsky, Alex; "Outsmarting Proctors with Smartwatches: A Case Study on Wearable Computing Security", Proc. 18th Intl. Conference on Financial Cryptography and Data Secutiy, Mar. 2014. University of Michigan.

Narayanaswami, C.; "IEEE Xplore—Application design for a smart watch with a high resolution display", Oct. 16-17, 2000. IEEE Xplore Digital Library. Http://ieeexplore.ieee.org/xpl/login.jsp?tp=&arnumber=888452&url=ht...A%2F%2Fieeexplore.ieee.org%2Fxpls%2Fabs_all.jsp%3Farnumber%3D888452.

Online file server, online storage, online backup, FTP server, file sharing with access control and version management—Egnyte Cloud File Server. © 2014 EGNYTE, Inc. Date of download: Jan. 10, 2014. http://www.egnyte.com/file-server/online-file-server.html.

Pachal, Pete; "The Totally Wacky Way Motorola's New Droids Share Photos [Hands On]", Jul. 24, 2013.

Paluch, Dominik; "Toolkit for programmable watches", Ludwig-Maximillians-University, May 1, 2012 to Sep. 11, 2012.

Parrack, Dave; "Kreyos Meteor Smartwatch brings Star Trek tech to life", Gizmag, Jun. 25, 2013.

Pebble appstore to bring second life to smartwatch ecosystem—SlashGear, Dec. 18, 2013. ©2005-2014. http://www.slashgear.com/pebble-appstore-to-bring-second-life-to-smartwach-ecosystem-18309239/.

Pebble Managing App Resources © 2013 Pebble. Date of download: Jan. 10, 2014 Http://developer.getpebble.com/2/guides/managing-resources.html.

Pebble Technology That Makes Your Life Better—Date of download: Jul. 11, 2014 https://getpebble.com/discover.

Persistant Storage for Pebble OS © 2013 Pebble. Date of download: Jan. 10, 2014 Http://developer.getpebble.com/2/guides/persistant-storage.html.

"SendApp—Share your apps"—Android Apps on Google Play, Sep. 23, 2013.

Share Apps—Android Apps on Google Play; Nov. 2, 2013 http://play.google.com/store/apps/details?id=com.for2w.appshare.

"XcelMobility, Inc. Launches Cloud Connected Smartwatch", XcelMobility, Inc. Jan. 30, 2014.

I'M Watch—Start Living Smarter! Date of download: Jul. 16, 2014.

U.S. Appl. No. 14/311,133; Office Action mailed Sep. 3, 2014.

\* cited by examiner

SHARING MOBILE APPLICATIONS BETWEEN CALLERS

CROSS-REFERENCE TO RELATED APPLICATIONS

The present patent application claims the priority benefit of U.S. provisional patent application No. 62/007,927 filed Jun. 4, 2014 and U.S. provisional patent application No. 62/007,858 filed Jun. 4, 2014, the disclosures of which are incorporated herein by reference.

BACKGROUND

1. Field of the Invention

The present invention generally relates to mobile applications operable on mobile devices. More specifically, the present invention relates to sharing mobile applications between callers.

2. Description of the Related Art

Mobile device software applications are a significant and growing portion of the smartphone industry. Mobile applications are designed to run on smartphones, tablet computers (including electronic reading devices or e-readers), and other mobile devices. apps may be made available by application developers through application distribution platforms, many of which are typically operated by the owner of the mobile operating system, such as the Apple® app StoreSM, Google Play™, Windows® Store, and BlackBerry® app World™. Some apps are available for free, while others must be bought. Usually, such apps are downloaded from the platform to a target device, such as an iPhone®, BlackBerry®, Android®, or Windows® phone, other mobile device, laptop, or desktop computer.

The more functions a mobile device has, the more useful it is to its user. Further, mobile device often used to multi-task (e.g., executing an apps during a telephone call). There is, however, currently no easy way for users to control a common application together (e.g., concurrently view the exact same instance of an application and its data at the same time). For example, a user may wish to perform certain application functions with another user, including editing an email/note, searching for directions, or reviewing financial data.

Some social gaming applications allow for multiple users to exchange data to view a game session with multiple users at the same time. Such game applications, however, are unable to be executed during a telephone call. In addition, such game applications may be associated with a dedicated game server that hosts the session, which some application developers are unable or do not have the resources to provide. Further, sharing capabilities across multiple users may be somewhat tangential to a primary purpose of an application (e.g., providing directions via a Maps application). As such, many popular applications lack the ability to be shared by multiple devices.

There is, therefore, a need in the art for improved systems and methods for enabling sharing of mobile applications between callers.

SUMMARY OF THE DISCLOSURE

Embodiments of the present invention include systems and methods for sharing of mobile applications between callers. A telephone call connection may be provided between a first mobile device and a second mobile device. A selection may be received from a user of the first mobile device that indicates at least one application previously enabled for sharing. It may be detect that the second mobile device has also enabled sharing of the same application. The application may be executed on the first mobile device and the second mobile device. Further, any updated data related to the application may be automatically exchanged between the first mobile device and the second mobile device.

Various embodiments may include methods for sharing of mobile applications between callers. Such methods may include providing a telephone call connection between a first mobile device and a second mobile device, receiving a selection from a user of the first mobile device that indicates at least one application previously enabled for sharing, executing instructions by a processor to detect that the second mobile device has also enabled sharing of the at least one application, to execute the at least one application on the first mobile device and the second mobile device, and to automatically exchange any updated data related to the at least one application between the first mobile device and the second mobile device.

Further embodiments may include apparatuses for sharing of mobile applications between callers. Such apparatuses may include communication circuitry for providing a telephone call connection between a first mobile device and a second mobile device, a user interface for receiving a selection from a user of the first mobile device that indicates at least one application previously enabled for sharing, and a processor for executing instructions stored in memory to detect that the second mobile device has also enabled sharing of the at least one application, to execute the at least one application on the first mobile device and the second mobile device, and to automatically exchange any updated data related to the at least one application between the first mobile device and the second mobile device.

Still further embodiments of the present invention may include non-transitory computer-readable storage media, having embodied thereon programs executable by processors to perform a method for sharing of mobile applications between callers as described herein.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings.

DETAILED DESCRIPTION

Embodiments of the present invention include systems and methods for sharing of mobile applications between callers. A telephone call connection may be provided between a first mobile device and a second mobile device. A selection may be received from a user of the first mobile device that indicates at least one application previously enabled for sharing. It may be detect that the second mobile device has also enabled sharing of the same application. The application may be executed on the first mobile device and the second mobile device. Further, any updated data related to the application may be automatically exchanged between the first mobile device and the second mobile device.

Figure 1:
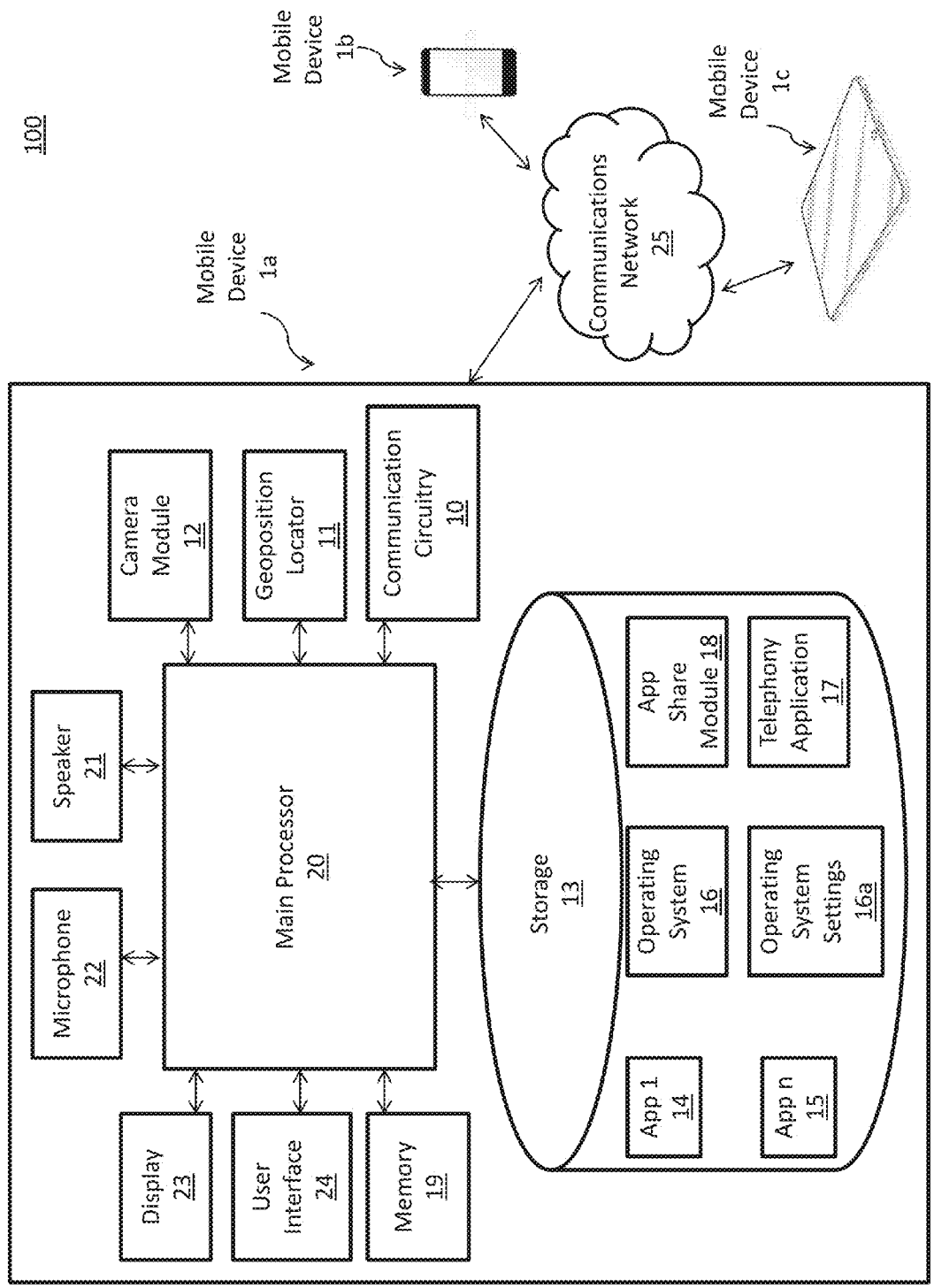
FIG. 1 illustrates an exemplary network environment in which a system for sharing mobile applications between callers may be implemented.

FIG. 1 illustrates an exemplary network environment 100 in which a system for sharing mobile applications between callers may be implemented. Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Mobile device 1a may be any handheld mobile communications device that supports a two-way voice conversation that may be part of a voice call or a video call, or any other communication system (e.g., Facetime or Skype videotelephone calls) known in the art, collectively referred to as a call that has been established between the user of the mobile device 1a and other users (e.g., of mobile devices 1b-c). Users may use any number of different electronic devices 1a-c, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 25. User devices 1a-c may also be configured to access data from other storage media, such as memory cards or disk drives as may be appropriate in the case of downloaded services. User device 1a-c may include standard hardware computing components such as network and media interfaces, non-transitory computer-readable storage (memory), and processors for executing instructions that may be stored in memory.

Evolving wireless technologies are able to provide greater bandwidth, thereby increasing capacity and allowing for enhanced services. The mobile device 1a may include the capability for a simultaneous data call (also referred to as a packet service call) while a voice call (also referred to as a circuit service call) is in progress. In particular, the mobile device 1a may be a cellular phone, a smart phone, or any other portable wireless device that is capable of supporting a two-way real-time voice call (e.g., circuit service call) simultaneous with a data communications channel (e.g., packet service call). The mobile devices 1b-c may be a similar communications device that has the capability of supporting a call for the party to conduct a voice conversation with the user of the mobile device 1a, simultaneous with a data channel that lets the mobile device 1b-c receive sharing application data from the mobile device 1a and then interact with the device 1a through the visual menu.

The mobile device 1a may communicate with mobile devices 1b-c through a communications network 25, in accordance with any technology suitable for mobile communications such as General Packet Radio Service (GPRS), Global Systems for Mobile (GSM), Code Division Multiple Access (CDMA), Universal Mobile Telecommunications System (UMTS), Integrated Dispatch Enhanced Network (iDEN), 3G technologies, etc. In some embodiments, the mobile device 1a may also communicate with the mobile device 1b-c through a network composed of several different types of networks that cooperate with each other (e.g., via gateways) to establish and conduct a call. For example, the communications network 25 may include, in addition to the cellular network, traditional telephone lines and circuit switches (Plain Old Telephone System, POTS), voice over wireless local area network or WiFi (e.g., a IEEE 802.11 protocol), high frequency systems (e.g., 900 MHz, 2.4 GHz, and 5.6 GHz communications systems), infrared, other relatively localized wireless communication protocol, or any combination thereof.

The mobile device 1a may have a housing (not shown) in which are integrated the components depicted in FIG. 1. The mobile device 1a may include a main processor 20 that may interact with communications circuitry 10, a geo-position locator 11, camera circuitry 12, storage 13, memory 19, a speaker 20, a microphone 22, display 23, and user interface 24. The various components of the mobile device 1a may be digitally interconnected and used or managed by a software stack being executed by the main processor 20. Many of the components shown or described here may be implemented as one or more dedicated hardware units and/or a programmed processor (software being executed by a processor, e.g., the main processor 20).

The main processor 20 may control the overall operation of the device 1a by performing some or all of the operations of one or more applications implemented on the mobile device 1, by executing instructions for it (software code and data) that may be located in the storage 13. The processor 20 may, for example, drive the display 23 and receive user inputs through the user interface 24, which may be integrated with the display 23 as part of a touch screen on the front face of the mobile device 1a. The main processor 20 may also perform the operations of providing the mobile device 1b with interactive information, such as information communicated through app share module 18, while the user of mobile device 1a is in telephonic communication with parties of other mobile devices 1b-c.

Storage 13 may provide for data storage using nonvolatile solid state memory (e.g., flash storage) and/or a kinetic nonvolatile storage device (e.g., rotating magnetic disk drive). Storage 13 may further include both local storage and storage space on a remote server. Storage 13 may store data, such as apps 14-15 (e.g., calendar app), status updates 16, and software components that control and manage, at a higher level, the different functions of the mobile device 1. For instance, there may be a telephony application 17 that configures a built-in touch-sensitive display to look like the keypad of a traditional telephone handset, and allows the user to enter a telephone number to be called, or select a previously stored number from a telephone address book. The telephony application 17 may register the media device as a cellular handset with the nearest cellular base station (using the appropriate cellular communications protocols built into the mobile device 1). The application may then proceed to allow the user to initiate or answer a call. Such application may further access the built-in microphone 22 and drive the earpiece speaker 21 to enable the user to conduct a two-way conversation during the call, as well as allow the user to invoke app share module 18 based on some form of user input (e.g., selecting a setting or icon associated with the app share module 18). Storage 13 may also include a variety of apps 14-15 (e.g., calendar app, games app, etc.). Some apps may be share-enabled, which allow another device 1b-c to communicate with mobile device 1a and to allow sharing of the app as long as both users have the same app and the app share module 18. Storage 13 may also include software for the mobile device operating system 16, as well as operating system settings 16a (e.g., standard operating system settings as well as new operating system settings specific to the app share module 18). Storage 13 may also include the app share module 18 that controls the app sharing functions, data, and controls.

In addition to storage 13, there may be memory 19 (also referred to as main memory or program memory), which may provide access to stored code and data that is being executed by the main processor 20. Memory 19 may include solid state random access memory (RAM), static RAM, or dynamic RAM. There may be one or more processors (e.g., main processor 20) that run or execute various software programs, modules or sets of instructions (e.g., applications) that, while stored permanently in the storage 13, may have been transferred to the memory 19 for execution to perform the various functions described above. It should be noted that these modules or instructions need not be implemented as separate programs, but rather may be combined or otherwise rearranged in various combinations. In addition, the enablement of certain functions could be distributed amongst two or more modules, and perhaps in combination with certain hardware.

The mobile device 1a may include communications circuitry 10. Communications circuitry 10 may include components that enable the above mentioned call and data channel transfer over a wireless link with a nearby base station. For example, communications circuitry 10 may include RF communications circuitry that is coupled to an antenna, so that the user of the mobile device 1a can place or receive a call through a wireless communications network. The RF communications circuitry may include a RF transceiver and a cellular baseband processor to enable the call through a cellular network. The communications circuitry 10 may also include Wi-Fi communications circuitry, which may be used to establish a (e.g., concurrent) data channel with the mobile device 1b. The Wi-Fi circuitry may also be used to conduct the call using a voice over Internet Protocol (VoIP) connection, through a wireless local area network (instead of a cellular network connection).

The mobile device 1a may also include a geo-position locator 11, which allows the mobile device 1a to determine its current geographic position. Such position may be obtained by a global positioning system (GPS). Using a GPS, the mobile device 1a can ascertain its present geographic location (latitude, longitude, and altitude), by the detection and processing of signals from geo-synchronous satellites. The mobile device 1a may use other alternative systems to determine its geographic location, such as line-of-sight, dead reckoning, wireless triangulation, or an equivalent location determination system. The geo-position locator 11 may be used to determine the current geographic location of the mobile device 1. The user of the mobile device 1a may configure the device to share such current location data with the party that the user places on hold.

The mobile device 1a may also include a digital camera module 12 that implements the digital camera functionality of the mobile device 1. The camera module 12 may be used to capture digital still images and/or videos that may be stored in the storage 13 and which may be shared with the party of the mobile device 1b while the party is on hold.

In operation, main processor 20 may perform normal functions of mobile device 1a (e.g., communicate with and coordinate operations of display 23, user interface 24, memory 19, microphone 22, speaker 21, camera module 12, geo-position locator 11, and communication circuitry 10). Other mobile devices 1b-c may communicate with mobile device 1a through communications network 25. Mobile device 1a may also store data and software in storage 13, which stores apps 14-15, operating system 16, operating system settings 16a, telephony application 17, and app share module 18. Other mobile devices 1b-c can also enable the same app sharing functions through their respective operating system settings 16a of their respective operating system 16. When user of mobile device 1a is in phone communication with mobile device 1b through communications network 25, the users of both devices 1a-b can invoke app share module 18 to allow both users to share applications that are enabled for sharing (assuming both devices 1a-b have and invoke the same app and the app share enable module 18).

Figure 2:
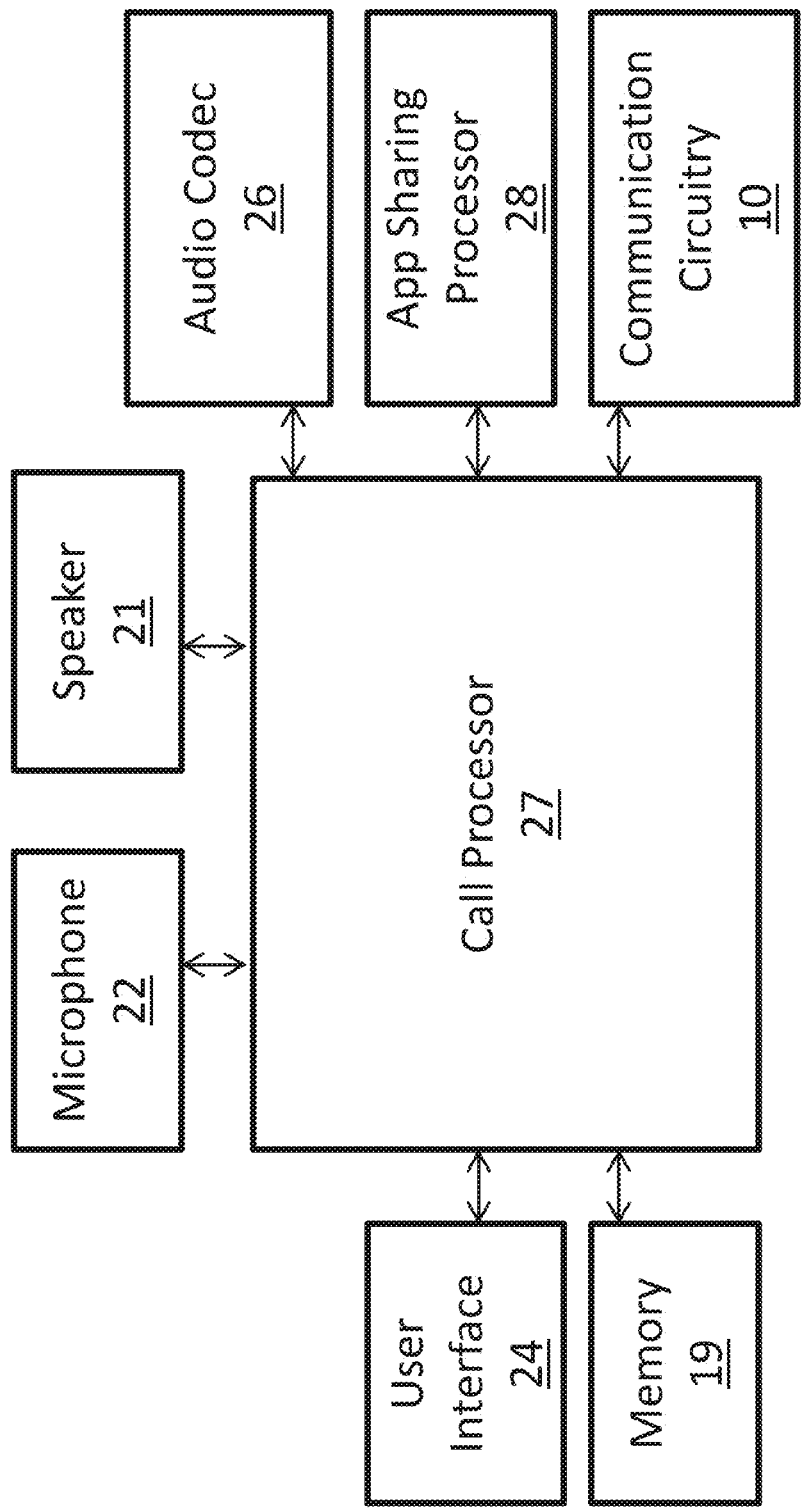
FIG. 2 is a diagram illustrating exemplary device architecture of an exemplary user device that may be used in a system for sharing mobile applications between callers.

FIG. 2 is a diagram illustrating exemplary device architecture of an exemplary user device 200 that may be used in a system for sharing mobile applications between callers. In addition to communications circuitry 10, speaker 21, microphone 22, and user interface 24, the device architecture 200 may also include an audio coder-decoder (codec) 26, a call processor 27, and an app share module processor 28. The call processor 27 and the app share module processor 28 may be implemented as one or more dedicated hardware units and/or a programmed processor (e.g., the main processor 20 executing software).

The audio codec 26 may act as an analog/digital interface to the microphone and the speaker, by providing analog amplifiers, other analog signal conditioning circuitry, and analog to digital and digital to analog conversion circuitry for interfacing the analog acoustic transducer signals with digital audio processing algorithms running in the codec 26 and in the call processor 27.

The call processor 27 may configure a built-in touch-sensitive screen (e.g., part of the user interface 24) to look like the keypad of a traditional telephone handset, thereby allowing the user to enter a telephone number to be called or to select a previously stored number from a telephone address book. The call processor 27 may register the device 1a as a cellular handset or user equipment with the nearest cellular base station (using the communications circuitry 10, appropriate cellular baseband processing, and communications protocols that are built into the device 1a). The call processor 27 may then proceed to enable the user to initiate or answer a call. Thereafter, during the call, an uplink audio signal may be routed from the microphone 22 to the communications circuitry 10, while downlink audio signal drives the speaker 21 (via audio codec 26) to enable the user to conduct a two-way conversation during the call. The call processor 27 can also assist in allowing data sharing of the app share module 18 of FIG. 1 with mobile device 1b.

The app share module processor 28 enables the user of the mobile device 1a to select or indicate, via the user interface 24, what app is to be shared with the party that the user is communicating with, as well as establishes a data channel with the mobile device 1b through the communications circuitry 10. The data channel may then be used to provide the selected interactive information (e.g., the selected share-enabled app) to the party, while the parties are on the call.

Figure 3:
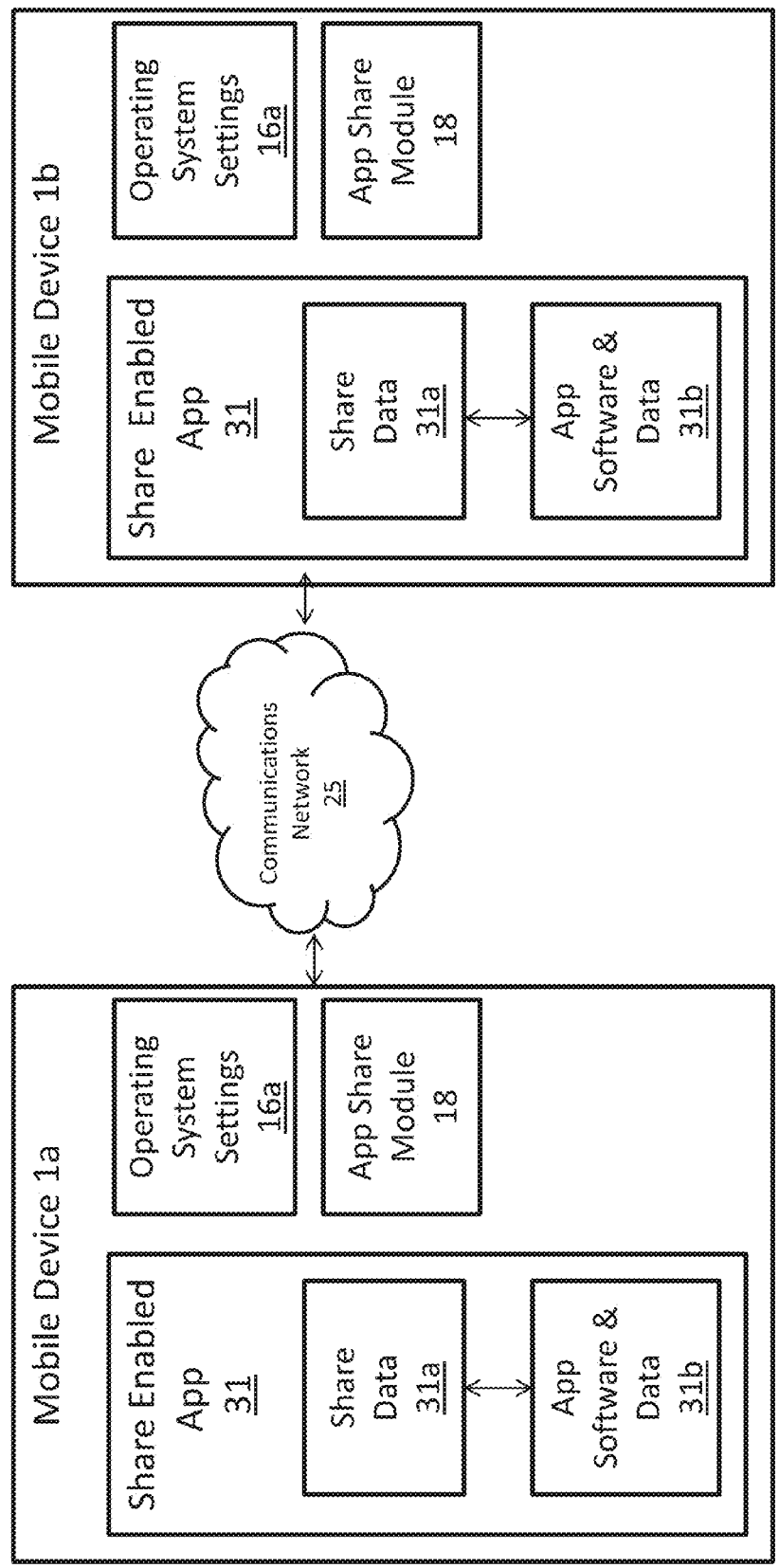
FIG. 3 is a block diagram that represents data sharing between user devices in a system for sharing mobile applications between callers.

FIG. 3 is a block diagram that represents data sharing between user devices 1a-b in a system for sharing mobile applications between callers. Mobile devices 1a-b may both include the same share-enabled app 31, operating systems settings 16a, and app share module 18. Share-enabled app 31 may include share data 31a and app software and data 31b. Communications network 25 allows for various types of communications between devices.

Mobile device 1a may include one or more share-enabled apps 31, which may be any app that is executable on the mobile device 1a and allows for sharing. These apps may include game apps, financial apps, productivity apps, organizations apps, etc. Share-enabled app 31 may be one of a special group of apps that are designed by the app developers to be capable of running in normal mode as well as app share mode. Alternatively, app share module 18 may permit some level of sharing (e.g., shared displays) even for apps that may not be specifically developed for sharing. In such situations, data that runs the apps may be synchronized. As such, when one app at a first user device is changed, its display is changed. The same data regarding such changes is exchanged with the second app, and the display of the second app is therefore changed as well. In this way, the lowest bandwidth changes may be required, rather than synchronizing screens through screen scrapping of pixels.

In app share mode, certain data may be made available to be sent through the app share module 18 through communications network 25 to a mobile device 1b where that data is interpreted to run the share-enabled app 31 on the mobile device 1b in real-time, so that the mobile device 1b can see the share-enabled app running on mobile device 1a. The data may be sent through the cellular communication path as the user is talking.

Operating systems settings 16a may include settings (described in further detail with respect to FIG. 4) that allow the users of mobile devices 1a-b to enable app share mode as well as app share mode functions. App share module 18 may allow for sharing of share-enabled app 31, which may include a share data 31a memory region and app software and data 31b memory region. App software and data 31b may contain the executable code of the app, as well as code to input and output share data that allows a remote user to see the same share-enabled app in real-time. Share data 31a may include such data as which page the share-enabled app is on (e.g., page 3 of the app). When this data is in share data 31a, the page data 3 may be sent to the mobile device 1b through the app share module 18 over the communication network to the mobile device 1b, which is also running the same share-enabled app such that the share-enabled app also jumps to page 3. Other share data 31b may be field data (data stored in fields), such as date, time, memo field, or any data that is user selectable by the mobile device 1a user. When this field data is in share data 31a, the field data 3 may be sent to the mobile device 1b through the app share module 18 and communication network to the mobile device 1b, also running the same share-enabled app so that that share-enabled app also inputs this field data to the app running on the mobile device 1b share-enabled app. There are many other forms of data that can be stored in share data 31a for transmittal back and forth between mobile devices 1a and 1b (e.g., links, graphics, any media files, rich media files, command strings, memo fields, text fields, equations, etc.). In addition, share module 18 may contain control features that not only controls the share data 31a between users but also allows the users to determine various controls (e.g., who the sender or receiver is). Further, it should be noted that many users may be on a call at one time, but only one user may be in control at a time. Also, it should be noted that users doing calls over voice over IP may have the same share-enabled options.

When operating system settings 16a is enabled and app share module 18 is invoked on both the mobile devices 1a-b during a communications or phone call, share data 31a of share-enabled app 31 may be exchanged between users. Any change made by the user designated as being in control of the share-enabled app 31 may be seen by the recipient user viewing their share-enabled app 31.

Figure 4:
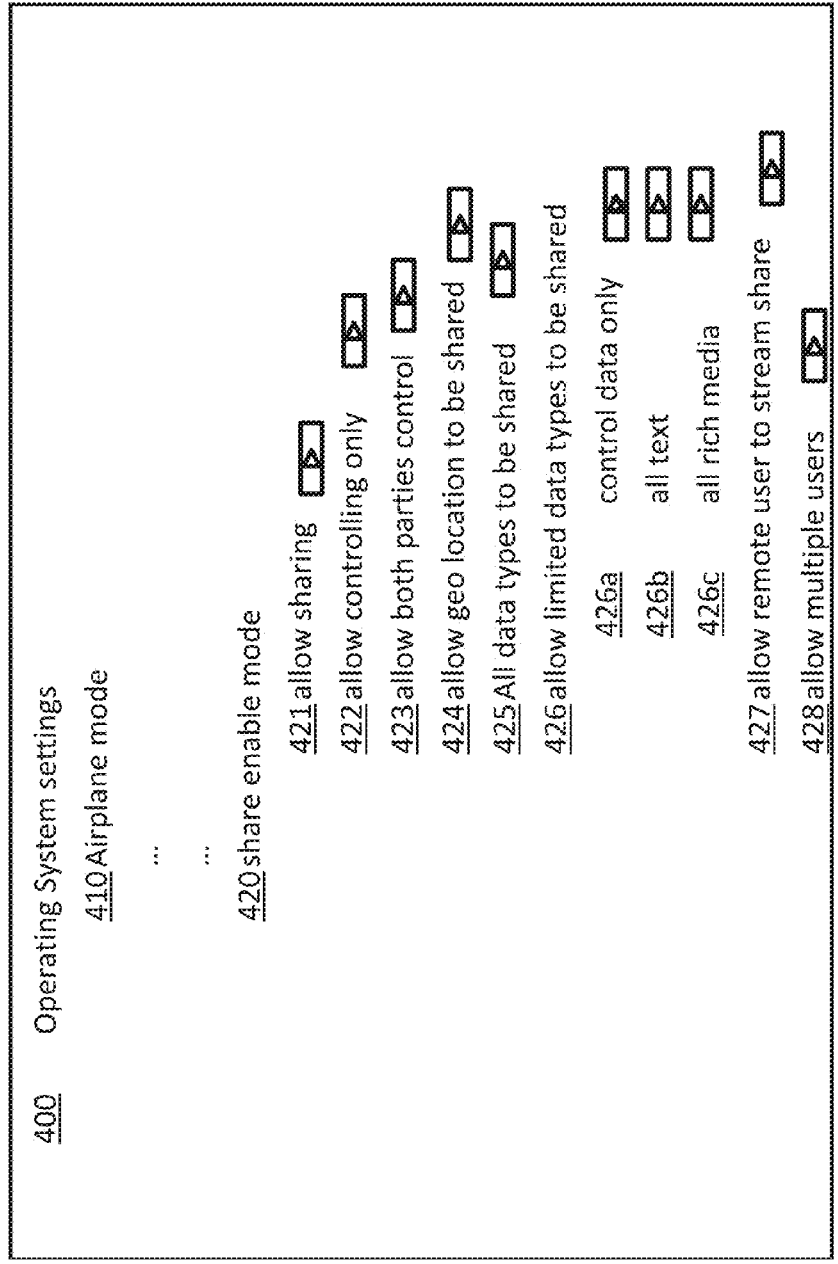
FIG. 4 is a diagram illustrating exemplary settings of an operating system on a user device that may be used with a system for sharing mobile applications between callers.

FIG. 4 is a diagram illustrating exemplary settings 400 of an operating system on a user device that may be used with a system for sharing mobile applications between callers. Such operating system settings 400 may include airplane mode 410, share enable mode 420, allow sharing 421, allow controlling only 422, allow both parties control 423, allow geo location to be shared 424, all data types to be shared 425, allow limited data types to be shared 426, control data only 426a, all text 426b, all rich media 426c, allow remote user to stream share 427, and allow multiple users 428.

Airplane mode 420 is an example of typical mobile device 1a operating system settings. Allow sharing 421 may be a share-enabled operating system setting that enables sharing between users. Allow controlling only 422 may be a share-enabled operating system setting that only allows the user of the device to control or send shared data for a share-enabled app. Allow both parties control 423 is a setting that can allow either party, based upon control of the app share module 18 to share app data and viewing. Allow geo-location to be shared 424 is a setting that allows the geo-location of either user to be shared. Geo-location is considered a security issue not only for the user whose data may be collected, but also for the remote user.

All data types to be shared 425 is a setting that allows the user to broadly provide rights of any data (except geo location if turned off) to be shared. Allow limited data types to be shared 426 is setting that allows a user to limit what data types can be shared. This may be significant, because the user may inadvertently have data stored that they might not want to share (e.g., family photographs). Once this is enabled, a sub menu of options may appear.

Control data only 426a is a submenu item for Allow limited data types to be shared 426 that allows that only allows control data (e.g., pages, menus, etc.) to be shared. This may be useful, for instance, for a user to perform a quick demonstration or training session for a remote user without exposing any personal data. All text 426b is a submenu item for Allow limited data types to be shared 426 that allows the user to share not only control data but text data but limit all other media data. All rich media 426c is a submenu item for Allow limited data types to be shared 426 that allows users to share all rich media (e.g., audio files, photos, etc.). Allow remote user to stream share 427 is a setting that allows a remote user to add another caller and share the share-enabled share app. Allow multiple users 428 is a setting that allows as many user connected in a call to share data of share-enabled apps.

Figure 5:
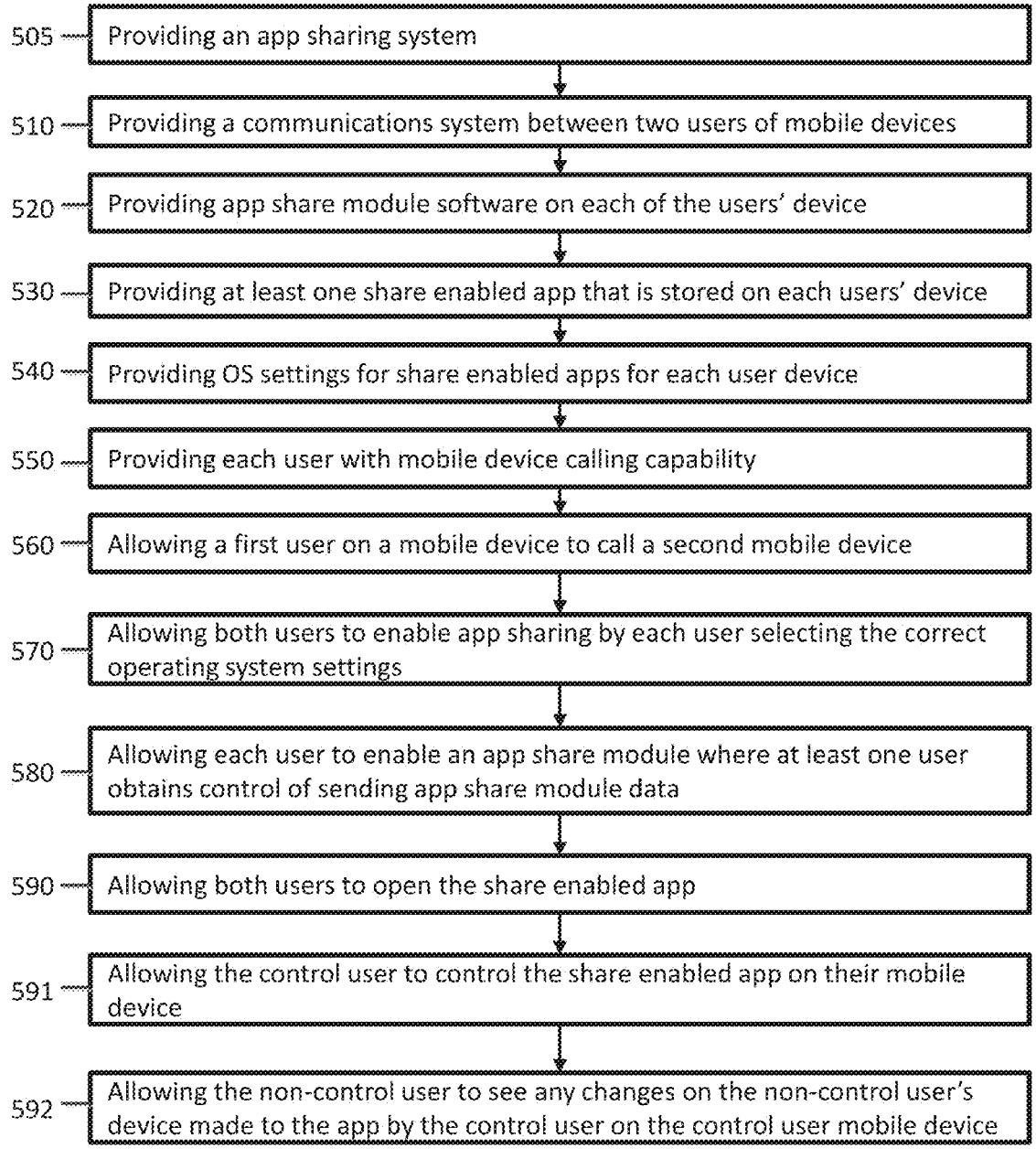
FIG. 5 is a flowchart illustrating an exemplary method for sharing mobile applications between callers.

FIG. 5 is a flowchart illustrating an exemplary method 500 for sharing mobile applications between callers. The app sharing system contains hardware and software to run a mobile device and a remote mobile device, using common share-enabled apps that are invoked through share-enabled operating systems and controlled by an app share module. The apps sharing system further allows for communications between mobile users.

Such a method 500 may include step 510, which provides a communications system between at least two users of mobile devices. In step 520, app share module software may be provided on each of the user devices. In step 530, at least one share-enabled app may be provided that is stored on each user device. In step 540, operating system settings for share-enabled apps may be provided for each user device.

In step 550, each user may be provided with mobile device calling capability. In step 560, a first user of a mobile device may be allowed to call a second mobile device. In step 570, both users may be allowed to enable app sharing when each user selects the correct operating system settings. In step 580, each user may be allowed to enable an app share module where at least one user obtains control of sending app share module data. In step 590, both users may be allowed to open the share-enabled app. In step 591, the control user may be allowed to control the share-enabled app on their mobile device. In step 592, the non-control user may be allowed to see and changes on the non-control user device made to the app by the control user on the control user mobile device.

Figure 6:
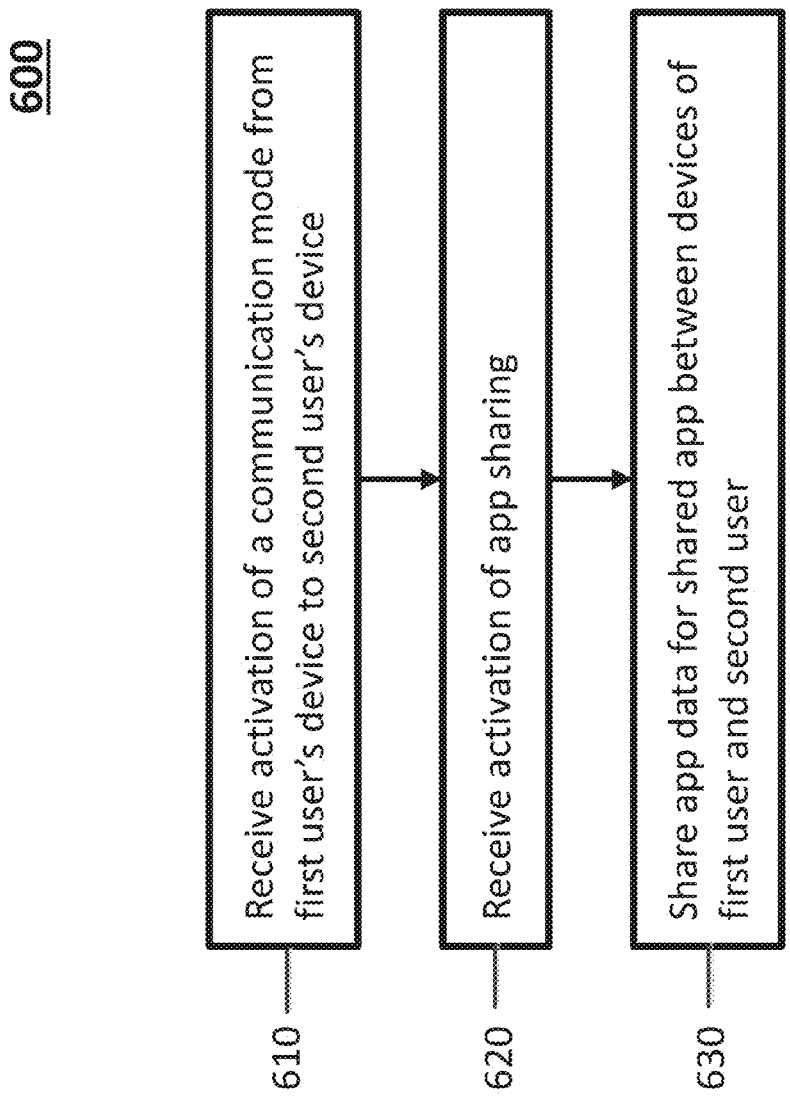
FIG. 6 is a flowchart illustrating an alternate method for sharing mobile applications between callers.

FIG. 6 is a flowchart illustrating an alternative method 600 for sharing mobile applications between callers. Such a method 600 may include step 610, in which activation of communications mode may be sent from a first mobile device to a second mobile device. In step 520, each mobile device may also receive an activation of app sharing from the user. In step 630, data may be shared between the two mobile devices.

Figure 7:
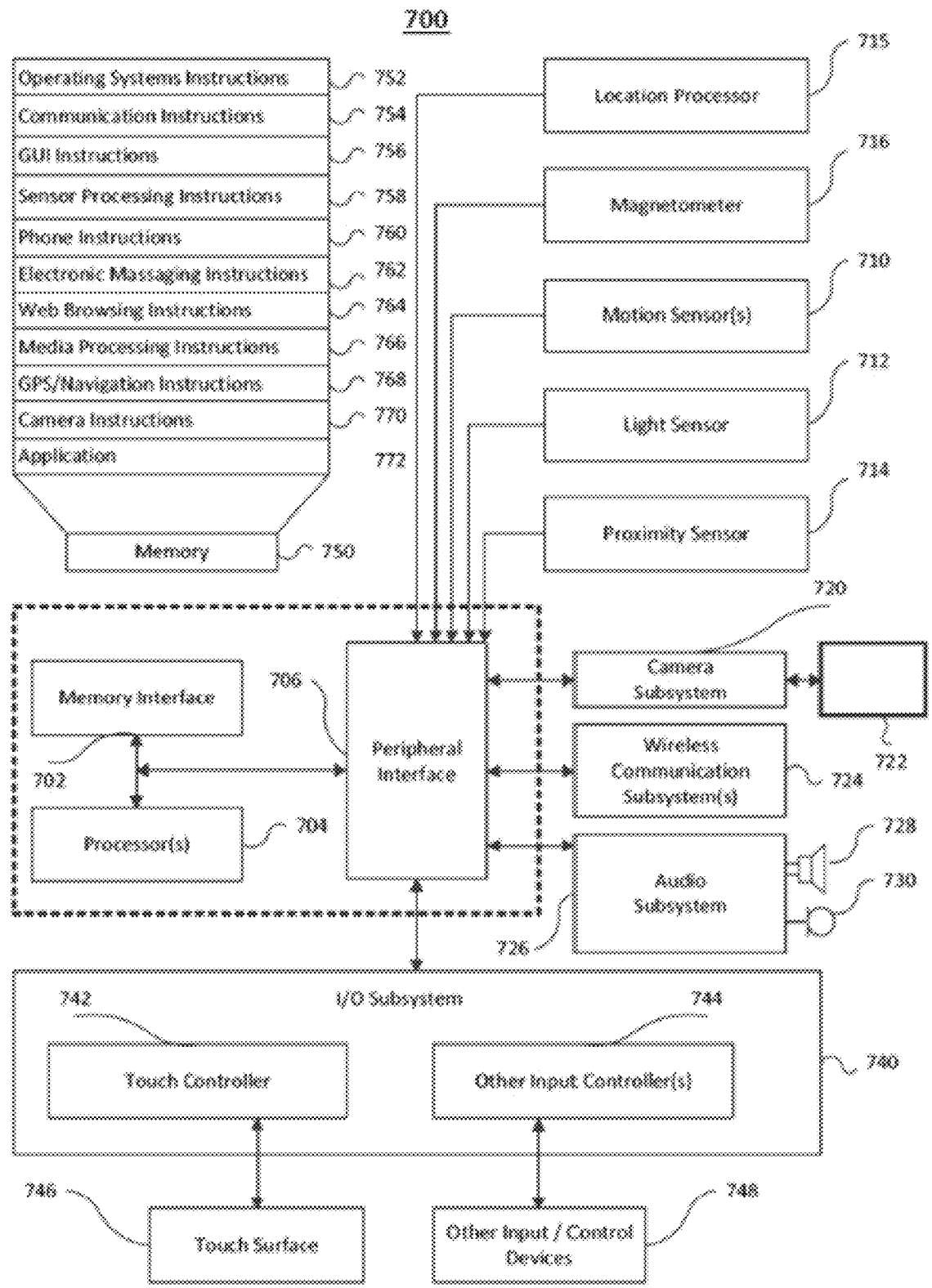
FIG. 7 illustrates a mobile device architecture that may be utilized to implement the various features and processes described herein.

FIG. 7 illustrates a mobile device architecture that may be utilized to implement the various features and processes described herein. Architecture 700 can be implemented in any number of portable devices including but not limited to smart phones, electronic tablets, and gaming devices. Architecture 700 as illustrated in FIG. 7 includes memory interface 702, processors 704, and peripheral interface 706. Memory interface 702, processors 704 and peripherals interface 706 can be separate components or can be integrated as a part of one or more integrated circuits. The various components can be coupled by one or more communication buses or signal lines.

Processors 704 as illustrated in FIG. 7 is meant to be inclusive of data processors, image processors, central processing unit, or any variety of multi-core processing devices. Any variety of sensors, external devices, and external subsystems can be coupled to peripherals interface 706 to facilitate any number of functionalities within the architecture 700 of the exemplar mobile device. For example, motion sensor 710, light sensor 712, and proximity sensor 714 can be coupled to peripherals interface 706 to facilitate orientation, lighting, and proximity functions of the mobile device. For example, light sensor 712 could be utilized to facilitate adjusting the brightness of touch surface 746. Motion sensor 710, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 706, such as a temperature sensor, a biometric sensor, or other sensing device to facilitate corresponding functionalities. Location processor 715 (e.g., a global positioning transceiver) can be coupled to peripherals interface 706 to allow for generation of geo-location data thereby facilitating geo-positioning. An electronic magnetometer 716 such as an integrated circuit chip could in turn be connected to peripherals interface 706 to provide data related to the direction of true magnetic North whereby the mobile device could enjoy compass or directional functionality. Camera subsystem 720 and an optical sensor 722 such as a charged coupled device (CCD) or a complementary metal-oxide semiconductor (CMOS) optical sensor can facilitate camera functions such as recording photographs and video clips.

Communication functionality can be facilitated through one or more communication subsystems 724, which may include one or more wireless communication subsystems. Wireless communication subsystems 724 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 724 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 724 may include hosting protocols such that the device may be configured as a base station for other wireless devices. Communication subsystems can also allow the device to synchronize with a host device using one or more protocols such as TCP/IP, HTTP, or UDP.

Audio subsystem 726 can be coupled to a speaker 728 and one or more microphones 730 to facilitate voice-enabled functions. These functions might include voice recognition, voice replication, or digital recording. Audio subsystem 726 in conjunction may also encompass traditional telephony functions.

I/O subsystem 740 may include touch controller 742 and/or other input controller(s) 744. Touch controller 742 can be coupled to a touch surface 746. Touch surface 746 and touch controller 742 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 746 may likewise be utilized. In one implementation, touch surface 746 can display virtual or soft buttons and a virtual keyboard, which can be used as an input/output device by the user.

Other input controllers 744 can be coupled to other input/control devices 748 such as one or more buttons, rocker switches, thumb-wheels, infrared ports, USB ports, and/or a pointer device such as a stylus. The one or more buttons (not shown) can include an up/down button for volume control of speaker 728 and/or microphone 730. In some implementations, device 700 can include the functionality of an audio and/or video playback or recording device and may include a pin connector for tethering to other devices.

Memory interface 702 can be coupled to memory 750. Memory 750 can include high-speed random access memory or non-volatile memory such as magnetic disk storage devices, optical storage devices, or flash memory. Memory 750 can store operating system 752, such as Darwin, RTXC, LINUX, UNIX, OS X, ANDROID, WINDOWS, or an embedded operating system such as VxWorks. Operating system 752 may include instructions for handling basic system services and for performing hardware dependent tasks. In some implementations, operating system 752 can include a kernel.

Memory 750 may also store communication instructions 754 to facilitate communicating with other mobile computing devices or servers. Communication instructions 754 can also be used to select an operational mode or communication medium for use by the device based on a geographic location, which could be obtained by the GPS/Navigation instructions 768. Memory 750 may include graphical user interface instructions 756 to facilitate graphic user interface processing such as the generation of an interface; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes, camera instructions 770 to facilitate camera-related processes and functions; and instructions 772 for any other application that may be operating on or in conjunction with the mobile computing device. Memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for sharing of mobile applications between callers, the method comprising:
    providing a communication call connection between a first mobile device and a second mobile device;
    receiving a selection from a user of the first mobile device, wherein the selection indicates at least one application previously enabled for sharing; and
    executing instructions stored in memory, wherein execution of the instructions by a processor:
        detects that the second mobile device has also enabled sharing of the selected application,
        executes the selected application on the first mobile device and the second mobile device during the communication call,
        automatically exchanges any updated data regarding commands for the selected application between the first mobile device and the second mobile device in real-time during the communication call, wherein the first mobile device receives commands made to the selected application under control of the second mobile device, and the second mobile device receives commands made to the selected application under control of the first mobile device, and
        executing the exchanged commands on the respective devices, wherein the selected application is synchronized on the first mobile device and the second mobile device during the communication call.

2. The method of claim 1, further comprising receiving settings from the user of the first mobile device, wherein the received settings enables sharing of the selected application with other mobile devices.

3. The method of claim 2, wherein the received settings provide that only a display of the selected application as displayed on the first mobile device is viewable by the second device based on data associated with the corresponding application enabled for sharing.

4. The method of claim 2, wherein the received settings provide that other users can control the selected application on the first mobile device.

5. The method of claim 4, wherein the received settings provide that only one user is designated as a control user and that only the control user can control the selected application.

6. The method of claim 2, wherein the received settings provide for sharing of geolocation information.

7. The method of claim 2, wherein the received settings provide for one or more types of data allowed to be shared.

8. The method of claim 2, wherein the received settings provide for sharing via streamed data.

9. The method of claim 2, wherein the received settings provide for concurrent sharing of data by the first mobile device with multiple other devices.

10. An apparatus for sharing of mobile applications between callers, the apparatus comprising:
    communication circuitry for providing a communication call connection between a first mobile device and a second mobile device;
    a user interface for receiving a selection from a user of the first mobile device, wherein the selection indicates at least one application previously enabled for sharing; and
    a processor for executing instructions stored in memory, wherein execution of the instructions by the processor:

detects that the second mobile device has also enabled sharing of the selected application, executes the selected application on the first mobile device and the second mobile device during the communication call, automatically exchanges any updated data regarding commands for the selected application between the first mobile device and the second mobile device in real-time during the communication call, wherein the first mobile device receives commands made to the selected application under control of the second mobile device, and the second mobile device receives commands made to the selected application under control of the first mobile device, and executing the exchanged commands on the respective devices, wherein the selected application is synchronized on the first mobile device and the second mobile device during the communication call.

11. The apparatus of claim 10, wherein the user interface further receives settings from the user of the first mobile device, wherein the received settings enables sharing of the selected application with other mobile devices.

12. The apparatus of claim 11, wherein the received settings provide that only a display of the selected application as displayed on the first mobile device is shared.

13. The apparatus of claim 11, wherein the received settings provide that other users can control the selected application on the first mobile device.

14. The apparatus of claim 13, wherein the received settings provide that only one user is designated as a control user and that only the control user can control the selected application.

15. The apparatus of claim 11, wherein the received settings provide for sharing of geolocation information.

16. The apparatus of claim 11, wherein the received settings provide for one or more types of data allowed to be shared.

17. The apparatus of claim 11, wherein the received settings provide for sharing via streamed data.

18. The apparatus of claim 11, wherein the received settings provide for concurrent sharing of data by the first mobile device with multiple other devices.

19. A non-transitory computer-readable storage medium, having embodied thereon a program executable by a processor to perform a method for sharing of mobile applications between callers, the method comprising:

providing a communication call connection between a first mobile device and a second mobile device;

receiving a selection from a user of the first mobile device, wherein the selection indicates at least one application previously enabled for sharing;

detecting that the second mobile device has also enabled sharing of the selected application;

executing the selected application on the first mobile device and the second mobile device during the communication call;

automatically exchanging any updated data regarding commands for the selected application between the first mobile device and the second mobile device in real-time during the communication call, wherein the first mobile device receives commands made to the selected application under control of the second mobile device, and the second mobile device receives commands made to the selected application under control of the first mobile device, and executing the exchanged commands on the respective devices, wherein the selected application is synchronized on the first mobile device and the second mobile device during the communication call.

\* \* \* \* \*